July 22, 1969 D. A. LUPFER 3,457,539

ELECTRICAL COMPONENT WITH A CLADDED LEAD

Filed Feb. 16, 1967

INVENTOR.
DAVID A. LUPFER

BY

Hopgood & Calimafde
ATTORNEYS

United States Patent Office 3,457,539

Patented July 22, 1969

3,457,539

ELECTRICAL COMPONENT WITH A CLADDED LEAD

David A. Lupfer, Metuchen, N.J., assignor to Nytronics, Inc., Berkeley Heights, N.J., a corporation of New Jersey Filed Feb. 16, 1967, Ser. No. 616,648
Int. Cl. H01c *1/14, 13/00;* H01f *15/10*
U.S. Cl. 338—322 7 Claims

ABSTRACT OF THE DISCLOSURE

An electronic component is provided employing a cladded lead connector which is characterized by resistance to oxidation at elevated temperatures combined with optimum strength properties. The connector is formed of a substrate of a metal selected from the group consisting of Fe, Ni, Fe-base and Ni-base alloys which has an intermediate layer of a bonding metal from the group consisting of Cu, Au, Pd, Pt, Rh and Ir and an outer cladding of silver.

This invention relates to a cladded alloy product and, in particular, to a cladded electrically conductive alloy element for use in the fabrication of miniaturized impedance components, said element being characterized by improved resistance to oxidation at elevated fabrication temperatures of upwards of 700° C. and higher combined with optimum strength properties.

In the fabrication of high quality electrical components, such as miniaturized capacitors or other impedance components, it is important that lead connectors be provided which will withstand exposure to temperatures of 700° C. or higher in oxidizing atmospheres.

In making lead connections or fastenings to electronic parts, tinned copper wire is commonly used. Silver coated alloy wire has also been used, such as a silver coated iron and nickel alloy. However, wires of the foregoing iron-nickel alloy materials have their limitations at elevated fabrication temperatures up to and over 700° C. in that oxidation tends to proceed through faults in the silver coating to the underlying material whereby the layer of silver would peel off.

Metals which have been proposed and tried as lead connectors include platinum, rhodium, iridium, gold, silver and alloys of these metals. While these metals will withstand oxidizing temperatures, their relatively high cost militates against their use. Moreover, it is not possible to obtain all of the desired thermal expansion characteristics which will substantially match the characteristics of the ceramic capacitor and associated enclosure. In addition, these metals tend to soften or anneal by exposure to high fabrication temperatures. For example, wrought work hardened silver loses its cold work temper very easily at temperatures substantially below 700° C. with a resultant drop in tensile strength.

Iron-nickel alloys, such as iron-base alloys and steel or nickel-base alloys, are attractive because of their relatively high strength in the wrought condition. However, to make them usable, they should have a metal coating of a high electrically conductive metal, such as silver. Electroplates are not adequate as stated hereinabove because of weak spots through which oxidation tends to proceed to the underlying oxidizable metal. Because of this, heavy cladding is preferred which besides has the additional advantage of providing a further control over thermal expansion. The combination of a silver cladding with the stiffer substrate metal yields a wire product which is less stiff. Moreover, the soft silver cladding provides a ductile zone of metal at the substrate capable of withstanding variations in thermal expansion.

However, in actual practice it is difficult to attain the foregoing desired composite structure because of the difficulty of bonding silver to iron, nickel or their alloys. Silver has a very low solid solubility in iron and nickel and there is substantially no diffusion of liquid silver in iron below 1000° C. It is common to weld, solder or braze silver to such substrate metals by using joining alloys containing copper, zinc, phosphorous, cadmium, antimony, tin, lead, or bismuth, but such joining alloys tend to be adversely affected by oxidizing atmospheres or tend to promote reactions deleterious to the end product. Moreover, zinc, cadmium, lead, antimony, phosphorous, and bismuth exhibit excessive vapor pressures at temperatures greater than 700° C. Tests have indicated that silver clad alloys, using conventional brazing materials in their production, have not been too successful as lead connectors at high fabrication temperatures.

It is thus the object of my invention to provide as an article of manufacture a cladded metal product for use as an electrically conductive element in capacitors or other impedance components characterized in that the metal employed as the cladding has a relatively high electrical conductivity and characterized further in that the cladded metal product exhibits resistance to oxidation at elevated fabrication temperatures.

Another object is to provide a wrought alloy product comprising a substrate metal selected from the group consisting of iron, nickel, iron-base and nickel-base alloys having a cladding of a silver or silver-base alloy adherently bonded to said substrate metal.

It is also an object to provide as an article of manufacture an electrical lead connector formed of a silver cladded metal product characterized by a high resistance to oxidation at fabrication temperatures up to 700° C. and higher combined with optimum strength properties at said temperatures.

It is a further object of the invention to provide an electrical component, such as a miniaturized impedance component, comprising an electrically conductive element having a lead connector extending therefrom formed of a wrought composite alloy comprising a metal substrate cladded with a silver or silver-base alloy.

These and other objects will more clearly appear when taken in conjunction with the following disclosure and the accompanying drawing, wherein.

Figure 1:
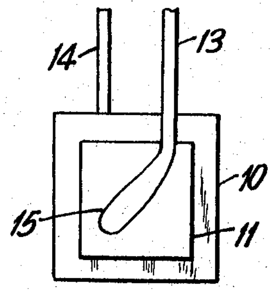
FIGS. 1 to 3 are illustrative of one embodiment of an electrical component comprising a capacitor in which the cladded alloy product of the invention is employed.

In accordance with my invention, I provide as an article of manufacture a wrought silver-cladded alloy product, for example, an electrically conductive element such as a lead connector, comprising a metal substrate selected from the group consisting of iron, nickel, iron-base and nickel-base alloys having in bonding relationship therewith a intermediate layer or zone of a bonding metal, other than silver, of melting point at least about 850° C., the oxide of said metal having a free energy of formation at about 25° C. not exceeding about 35,000 calories per gram atom of oxygen, and an outer cladding of silver bonded to said metal substrate via said intermediate layer or zone of said bonding metal with which said cladding metal is bondable.

An example of a metal substrate employed in carrying out the invention is an alloy comprising 58% Fe and 42% Ni. I find this alloy in the wrought condition is preferred in the production of cladded alloy lead connectors for ceramic capacitors because of its desirable combination of physical properties including its thermal expansion and its tensile strength. This alloy has a thermal coefficient of expansion in the neighborhood of about $5\times10^{-6}$ inch per inch per ° C. Iron-nickel alloys of the foregoing class may range from 65% to 45% Fe with the balance substantially 35% to 55% nickel. These alloys have a desirable range of thermal expansion for my purposes by ranging from about zero to about $11\times10^{-6}$ inch/inch/° C Examples of metals which I prefer to use as the intermediate bonding layer material in producing the cladded product are gold, copper, palladium, platinum, rhodium and iridium. These metals are characterized by melting points above 850° C. and by a negative free energy of formation of their corresponding oxides at 25° C. of not more than 35,000 calories per gram atom of oxygen and preferably not more than 22,000 calories. For example, cuprous oxide exhibits a negative free energy of formation of about 35,000 calories while cupric oxide exhibits a negative free energy value of 30,400 calories; gold oxide exhibits a very low negative free energy of formation below that for silver oxide; while the oxides of the platinum group metals Pt, Pd, Rh and Ir exhibit a negative free energy of formation at about 25° C. of below about 22,000 calories per gram atom of oxygen.

As stated above, the heavy layer of cladding metal is preferably silver because of its very high electrical conductivity. However, silver-base alloys may be employed. Examples of silver-base alloys are about 95% silver and the balance substantially palladium; about 90% silver and the balance substantially copper; about 80% silver and the balance substantially gold. Another is 85% Ag and 15% Pt. Where a silver-base alloy is used as the cladding metal, I prefer the alloy contain at least about 80% silver. In producing a cladded electrically conductive lead connector, it is important that the metal substrate to be cladded be thoroughly cleaned. As various cleaning methods are well known to those skilled in the art and available in the literature, they need not be described here. Where gold is used as the intermediate bonding metal layer, it is electroplated on a rod of the metal substrate from which the lead connector is made. After washing and drying the gold plate, the gold-plated rod may then be jacketed in a close fitting tube of silver and the composite assembly then given a light draft through a drawing die to compress the silver tube tightly around the rod. Thereafter, the assembly is subjected to a diffusion heat treatment in a reducing atmosphere at a temperature below the melting point of silver to diffusion bond the gold to the substrate metal and the silver to the intermediate layer of gold. As illustrative of the foregoing as applied to a metal substrate containing 58% Fe and 42% Ni, the following example is given for the production of a lead connector of 0.025 inch diameter.

A rod of the iron-nickel alloy of about 0.41 inch in diameter is provided. The rod is cleaned and then electroplated with an adherent layer of gold by deposition from a cyanide bath using conventional techniques. A thickness of about 0.0002 inch is deposited on the rod. The gold-plated rod after washing and drying is then slipped into a sleeve or tube of silver of internal diameter just sufficient to obtain a snug fit, the silver tube having a wall thickness of about 0.05 to 0.09 inch so as to provide a final clad thickness in the neighborhood of about 0.002 to 0.004 inch for a final wire diameter of about 0.025 inch.

Before inserting the gold plated rod into the silver sleeve, it may be desirable to subject the rod to a diffusion bonding heat treatment by heating it to a temperature of at least about 300° C. for several hours in a reducing atmosphere. In any event, after inserting the rod within the silver sleeve, the composite assembly having a diameter of about 0.59 inch is given a light pass through a drawing die to compress the silver against the gold-plated rod. The assembly is then subjected to a diffusion bonding heat treatment by heating it to an elevated temperature in the range of about 300° C. to 950° C. for upwards to about 6 hours. Thereafter the composite rod is subjected to a series of cold drawing and annealing stages until the final diameter of 0.025 inch is obtained. Generally, the last cold drawing step is controlled so as to provide a particular temper, such as ¼ or ½ hard, etc.

By using gold as the intermediate layer as described above, a good silver bond is obtained. In addition, oxidation of the substrate iron-nickel alloy is inhibited because of the extremley low propensity of the intermediate layer of gold to oxidize. Thus, the silver clad material is capable of use in oxidizing atmospheres at fabrication temperatures of up to 700° C. and higher.

Where platinum is employed as the intermediate layer of bonding metal, the substrate is coated by electroplating with platinum using a complex phosphate bath known in the art. Where rhodium is employed as the intermediate bonding layer, a sulfuric acid bath may be employed. Thicknesses of up to about 0.001 inch of rhodium may be obtained with sulfate solutions. If palladium is employed as the intermediate bonding metal, it may be electroplated on the substrate metal by using a bath containing ammonium chloride, hydrochloric acid and palladium chloride.

Figure 2:
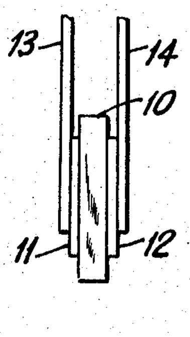
Figure 3:
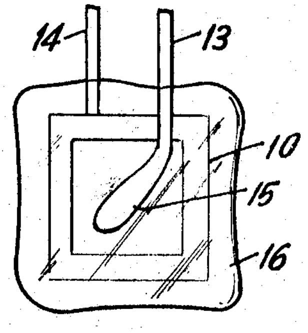
Figure 6:
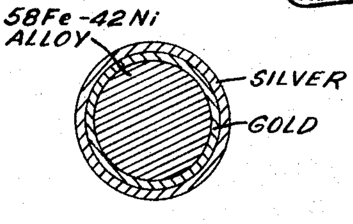
FIG. 6 is a cross section of one embodiment of a lead wire provided by the invention.

As illustrative of the various articles of manufacture which utilize the novel lead connector alloy of the invention, reference is made to FIGS. 1 to 3 which show a miniaturized capacitor comprising a thin ceramic substrate or wafer 10 of suitable dielectric material upon which the metallic film layers 11 and 12 of suitable conductive material, e.g. silver, platinum, copper, is deposited to form capacitor plates. The dielectric material may be rectangular, circular, cylindrical or any convenient shape. As a miniaturized capacitor, the wafer may be about 0.005″ thick and a square about ¼″ on the side. The deposited film may be about 0.001″ thick. The film may be applied by any suitable process such as, for example, by evaporation, sputtering, pyrolitic deposition, displacement from solution, spraying, or a painting. After an adherent metallic film has been obtained, lead connectors 13 and 14 of a composite alloy wire (note FIG. 6) of the invention (a silver-cladded 58Fe-42Ni alloy with gold as the intermediate layer) are connected to the metallic film. Referring to FIG. 1, lead connector 13 is shown flattened at its end 15 which is then resistance welded to metallic film 11, lead 14 being similarly welded to metallic film 12. After the leads have been joined to the capacitor plates, the completed capacitor is then encapsulated in a protective coating 16 of glass at an elevated temperature. If the connectors were made of work hardened silver, they would soften drastically under such treatment and lack the proper combination of physical properties. Silver hardened with copper would not be desirable as it exhibits low resistance to oxidation at elevated temperature. A connector of the silver-cladded alloy wire, on the other hand, has the desirable combination of electrical and physical properties for the purpose. In place of glass, the capacitor may be encapsulated in Teflon or a chlorinated fluorocarbon to protect it against the environment.

Figure 4:
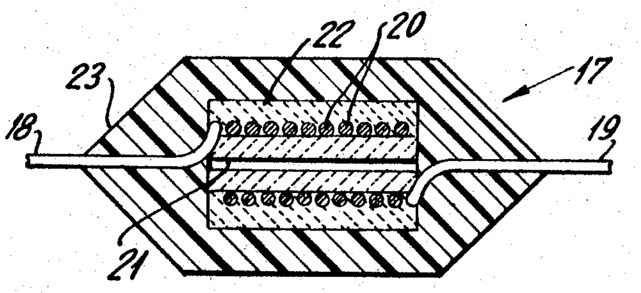
FIG. 4 depicts an inductor utilizing a lead connector of the cladded alloy product of the invention.

Another electrical component in which the cladded alloy connector may be employed is shown in FIG. 4 comprising an inductor 17. It will be noted that in this embodiment, the leads 18 and 19 are merely extensions of the coil 20 which is constructed of the same material as the connector. The inductor here illustrated comprises a hollow cylindrical core 21 of soft ferrite material around which a wire of diameter of 0.005″ to 0.01″ of a silver-cladded composition of a steel wire using palladium as the intermediate layer is wound with free ends 18 and 19 being provided as the leads. The core and coil is then coated with a slurry of similar soft ferrite material to form an outer cylindrical shell 22 which is baked by heating at an elevated temperature of about 700° C. to 1000° C., at which temperature a silver connector would drastically soften and weaken. Thereafter, the inductor may be encapsulated within a dielectric material 23, such as Teflon. The core of the inductor may be one having a length of about ¼", an outside diameter of about 0.1" and a hole of about 0.02" in diameter.

Figure 5:
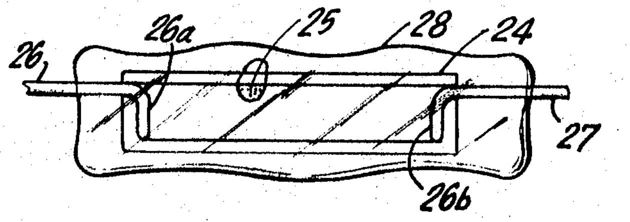
FIG. 5 illustrates the use of the cladded alloy connector as employed in the production of thin film resistors.

FIG. 5 shows a thin film resistor comprising a dielectric ceramic substrate 24 having deposited thereon a thin metallic film 25 of, for example, silver to which leads 26 and 27 of a silver-cladded nickel-base alloy (52Ni-48Fe) wire having an intermediate layer of copper are connected at ends **26*a* and 26*b*, respectively, the resistor being encapsulated in a glass coating 28** as shown.

Examples of other components are piezoelectric devices, such as transducers, filters, memory devices and switching elements. The component may also include electro-optic, magnetostrictive, or other dynamic devices where the properties of the lead connector and its connection may affect the performance of the device.

As has been stated hereinbefore, the metal substrate may comprise iron, nickel, iron-base and nickel-base alloys. Examples of iron-base alloys that may be employed as steels, e.g. SAE 1080 steel; 18/8 stainless steel; iron-base iron-nickel alloys, and the like. Examples of nickel-base alloys are nickel-base nickel-iron alloys; an alloy of 96% Ni-4% Al; 80% Ni, 14% Cr, 6% Fe; 49% Ni, 22% Cr, 9% Mo, 20% Fe, and the like.

It is preferred that the electric conductive element be made of a metal having a coefficient of expansion not exceeding $12 \times 10^{-6}$ inch/inch/° C.

With respect to the intermediate bonding metals, I find gold and palladium particularly desirable for my purposes. The thickness of the intermediate layer of the bonding metal in the final product may range from about 50 to as high as 50,000 angstroms. The silver clad in the final product may have a thickness ranging from about 1% to about 50% of the thickness of the final product.

The silver-cladded product provided by the invention permits the use of special firings and elevated temperature treatments of components produced therefrom, particularly capacitors and their enclosures, without undue weakening of the connections. In the form of wire, the cladded product permits bake out and module connections to be conducted at elevated temperatures. By the term "connector" is meant wrought shapes such as wire, strip, tubing and other wrought shapes completely cladded with silver and having utility as electrical connectors in electronic components.

The term "silver" used in the claims is meant to include pure silver and silver-base alloys, for example alloys containing preferably at least about 80% silver, and silver alloys having an electrical conductivity of at least 30% of standard (IACS).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An electronic component comprising a nonmetallic member, an electrically conductive element electrically associated with said non-metallic member and a cladded lead connector coupled to said electrically conductive element, said lead connector characterized by resistance to oxidation at elevated temperatures combined with optimum strength properties and comprising a substrate of a wrought alloy selected from the group consisting of Fe, Ni, Fe-based and Ni-base alloys having an intermediate layer of a bonding metal selected from the group consisting of Cu, Au, Pd, Pt, Rh and Ir, and an outer cladding of silver bonded to and surrounding said substrate via said intermediate layer of said bonding metal.

2. The electrical component of claim 1 wherein the intermediate layer of bonding metal is Au.

3. The electrical component of claim 1 wherein the intermediate layer of bonding metal is Pd.

4. The electrical component of claim 1 wherein the intermediate layer of bonding metal is Pt.

5. The electrical component of claim 1 wherein the intermediate layer of bonding metal is Rh.

6. The electrical component of claim 1 wherein the intermediate layer of bonding metal is Ir.

7. The electrical component of claim 1 wherein the thickness of the intermediate layer of bonding metal in the cladded lead connector ranges from about 50 to 50,000 angstroms, and wherein the thickness of the silver clad on the lead connector ranges from about 1% to 50% of the thickness of the final product.

References Cited

UNITED STATES PATENTS

| | | | |
|---|---|---|---|
| 1,001,669 | 9/1911 | Monnot | 29—199 X |
| 1,695,791 | 12/1928 | Yunck. | |
| 1,891,481 | 12/1932 | Scofield | 29—199 X |

E. A. GOLDBERG, Primary Examiner

U.S. Cl. X.R.

29—196, 199; 317—258; 336—192; 338—334